C. F. PIKE.
TRAP FOR CATCHING PORPOISES.
APPLICATION FILED APR. 9, 1908. RENEWED MAR. 1, 1910.
972,235.  Patented Oct. 11, 1910.
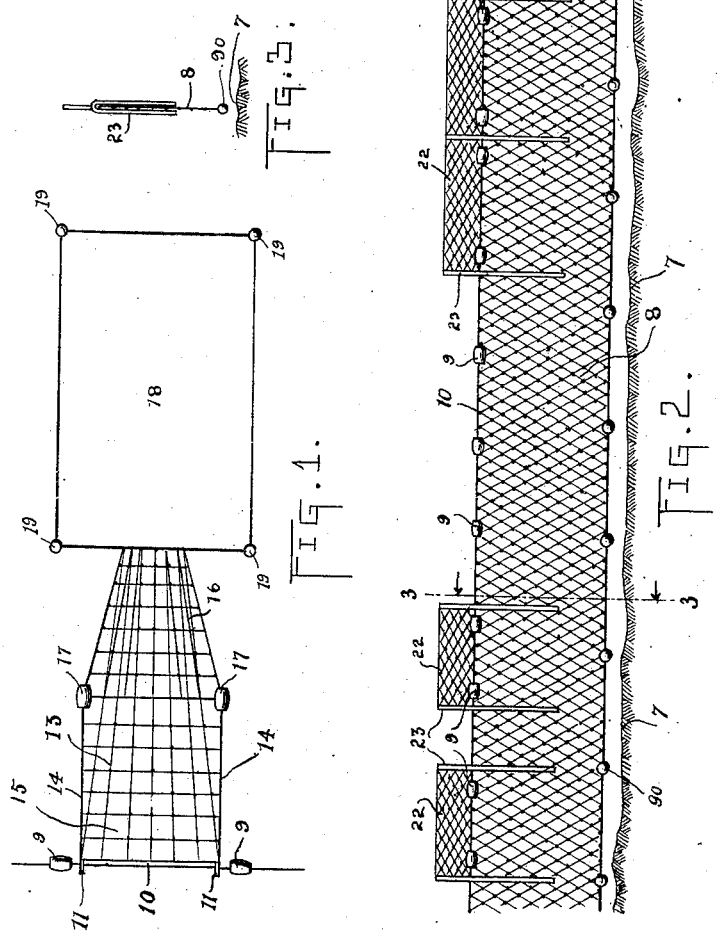
Witnesses
Clayton L. Shaw
S. Brashears
Inventor
CHAS. F. PIKE.
By Wm. A. Pike
Attorney

UNITED STATES PATENT OFFICE.

CHARLES F. PIKE, OF PHILADELPHIA, PENNSYLVANIA.

TRAP FOR CATCHING PORPOISES.

972,235. Specification of Letters Patent. Patented Oct. 11, 1910.

Application filed April 9, 1908, Serial No. 426,049. Renewed March 1, 1910. Serial No. 546,740.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, of which the following is a specification.

My invention relates to devices for catching fish and especially for catching the porpoise. In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof. The porpoise generally swim near the surface of the water and while they will to some extent pass through the opening in the obstruction placed in their path, they will be very liable, when they meet an obstruction, to jump over it and thus be lost to the fisher.

The object of my invention is to provide means whereby the fish will be caught after jumping over the obstruction and thus avoid the loss of such a large number as would occur in the use of the means now provided.

In other applications Serial Numbers 426,047 and 426,048 filed on the same date as this, I have illustrated and described specific constructions of means for carrying out the broad idea of providing traps for catching the fish which may jump over an encountered obstruction, but no means has been described or shown therein to prevent the fish jumping over the obstruction at points where there is no trap in the rear thereof, and inasmuch as the traps are only set at intervals along the obstruction, many of the fish jumping over the obstruction may escape.

The special object of the present invention is to provide means for preventing this loss of fish which may jump over the ordinarily constructed obstruction, between the traps, and with this object in view the invention consists of the improved construction, arrangement and combination of parts hereinafter fully described and afterward specifically claimed.

In order that others skilled in this art may be enabled to construct and use my invention I will now proceed to describe the same in connection with the accompanying drawings in which—

Figure 1 is a plan view of a trap and obstruction of any ordinary construction, to which the present invention may be applied. Fig. 2 is a front elevation showing an embodiment of my invention. Fig. 3 is a section on the broken line 3—3.

Referring specifically to the drawing, 7 indicates the bottom of a body or stream of water in which my invention may be utilized. An obstruction, in this instance shown as an ordinary seine is shown at 8 supported by floats of any ordinary kind at the surface of the water, as at 9 and held down by weights or sinkers 90. In the rear of the obstruction, that is to say on that side opposite to the one with which the porpoise would come into contact, is removably secured on the float line 10, by hooks 11 or other suitable means, a receptacle, in this instance shown as a trap or net having a bottom 13 and sides 14, 14, but open at the top, as at 15. Extending rearwardly from the open rear end of this trap 12, is a conically shaped tubular conduit, 16, supported by floats 17 and connecting at its rear open end with a receptacle 18, shown in Fig. 1 as a pound net 18 secured to piles or poles 19 and extending from the bottom of the water to a sufficient height to compensate for the rising and falling of the tide. In the forward end of the pound is a suitable opening in line with the rear open end of the conduit 16 and the trap and conduit, as well as the front of the pound, being flexible, the rise and fall of the obstruction 8, with the trap and conduit, will be compensated for without hindering the operation of the device. The porpoise, in swimming along, encounters the obstruction, in the form of the seine 8 and being unable to pass through it, jumps over it and drops into the trap, and continuing on in the same general direction is guided through the conduit or connection 16 into the pound 18 from which the contents may be removed in any suitable manner.

There may be as many traps set as desired or as permissible in any particular situation.

The construction thus far described forms no part of the present invention and may be modified in many ways.

In Figs. 2 and 3, I have shown one construction of the obstruction 8, which is embodied in my present invention in which I provide against the possibility of the fish jumping over the obstruction at points between the traps, or where there are no traps to receive them. In this construction 22 represents guards of netting or other suitable material on double armed frames 23 adapted to straddle the obstruction 8 whereby the guards are held in place and may be placed in position on the obstruction at any desired point, removed therefrom, or adjusted thereon, as may be desired. These guards, placed wherever there are no nets, will effectually prevent the escape of such fish as may approach the obstruction at points between the traps. I have shown these guards made separate from the obstruction, but they may be integral therewith, if desired, without departing from the spirit and scope of my invention.

Having thus fully described my invention, what I claim as new is:

1. A device of the character described comprising an obstruction which extends above the surface of the water at intervals and a trap located to receive and secure the fish which may jump over the parts of the obstructions between said extensions.

2. A device of the character described, comprising an obstruction in the path of travel of the fish, traps in the rear of the obstruction having open tops, to receive fish jumping over the obstruction, and guards on the obstruction above the water between the traps to prevent the fish from jumping over the obstruction at any points other than in front of the traps, substantially as described.

3. A device of the character described comprising an obstruction in the path of travel of the fish, traps in the rear of the obstruction having open tops, to receive fish jumping over the obstruction, and guards of netting comprising double armed frames adapted to be straddled on the obstruction above the water between the traps, to prevent the fish from jumping over the obstruction at any points other than in front of the traps, substantially as described.

4. A guard of the character described, comprising a rigid frame work having its sides constructed in the form of inverted forks, and netting stretched upon the frame, substantially as described.

In testimony whereof I affix my signature in presence of two witnesses.

CHARLES F. PIKE.

Witnesses:
JOHN DEVLIN,
FRANK GRAY.